(12) United States Patent (10) Patent No.: US 12,587,705 B2
Jin (45) Date of Patent: Mar. 24, 2026

(54) LIVESTREAMING AUDIO PROCESSING METHOD AND DEVICE

(71) Applicant: Beijing Bytedance Network Technology Co., Ltd., Beijing (CN)

(72) Inventor: Youzhi Jin, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 315 days.

(21) Appl. No.: 18/256,155

(22) PCT Filed: Nov. 29, 2021

(86) PCT No.: PCT/CN2021/134163
§ 371 (c)(1),
(2) Date: Jun. 6, 2023

(87) PCT Pub. No.: WO2022/121727
PCT Pub. Date: Jun. 16, 2022

(65) Prior Publication Data
US 2024/0040191 A1 Feb. 1, 2024

(30) Foreign Application Priority Data
Dec. 10, 2020 (CN) .......................... 202011458388.1

(51) Int. Cl.
*H04N 21/439* (2011.01)
*H04N 21/2187* (2011.01)
(52) U.S. Cl.
CPC ....... *H04N 21/439* (2013.01); *H04N 21/2187* (2013.01)

(58) Field of Classification Search
CPC ............. H04N 21/439; H04N 21/2187; H04N 21/4398; G10K 15/08
See application file for complete search history.

(56) References Cited

U.S. PATENT DOCUMENTS

2004/0125965 A1 7/2004 Alberth, Jr. et al.
2010/0182394 A1* 7/2010 Zhan ...................... H04N 7/152
348/14.01

FOREIGN PATENT DOCUMENTS

CN 103312912 A 9/2013
CN 108259985 A 7/2018
(Continued)

OTHER PUBLICATIONS

ISA China National Intellectual Property Administration, International Search Report Issued in Application No. PCT/CN2021/134163, Feb. 16, 2022, WIPO, 14 pages.
(Continued)

*Primary Examiner* — Phung-Hoang J Nguyen
(74) *Attorney, Agent, or Firm* — Alleman Hall LLP

(57) ABSTRACT

Embodiments of the present disclosure provide a livestreaming audio processing method and device, and the method includes: a processor of a first terminal receives second audio data sent by a second terminal; an audio processing apparatus of the first terminal receives the second audio data and third audio data sent by the processor through different channels, where the third audio data is audio data in the first terminal; the audio processing apparatus plays the second audio data; the audio processing apparatus sends first audio data recorded and the third audio data to the processor; and the processor sends the first audio data and the third audio data to the second terminal.

18 Claims, 7 Drawing Sheets

(56)         References Cited

FOREIGN PATENT DOCUMENTS

| CN | 109600677 | A |   | 4/2019 |
|----|-----------|---|---|--------|
| CN | 109767777 | A | * | 8/2019 |
| CN | 110166794 | A |   | 8/2019 |
| CN | 111263182 | A |   | 6/2020 |
| CN | 111294606 | A |   | 6/2020 |
| CN | 112616087 | A |   | 4/2021 |

OTHER PUBLICATIONS

China National Intellectual Property Administration, Office action issued in Chinese Application No. 202011458388.1, Mar. 9, 2022, 14 pages.
China National Intellectual Property Administration, Office action issued in Chinese Application No. 202011458388.1, Jul. 28, 2022, 14 pages.
China National Intellectual Property Administration, Office action issued in Chinese Application No. 202011458388.1, Nov. 21, 2022, 14 pages.

* cited by examiner

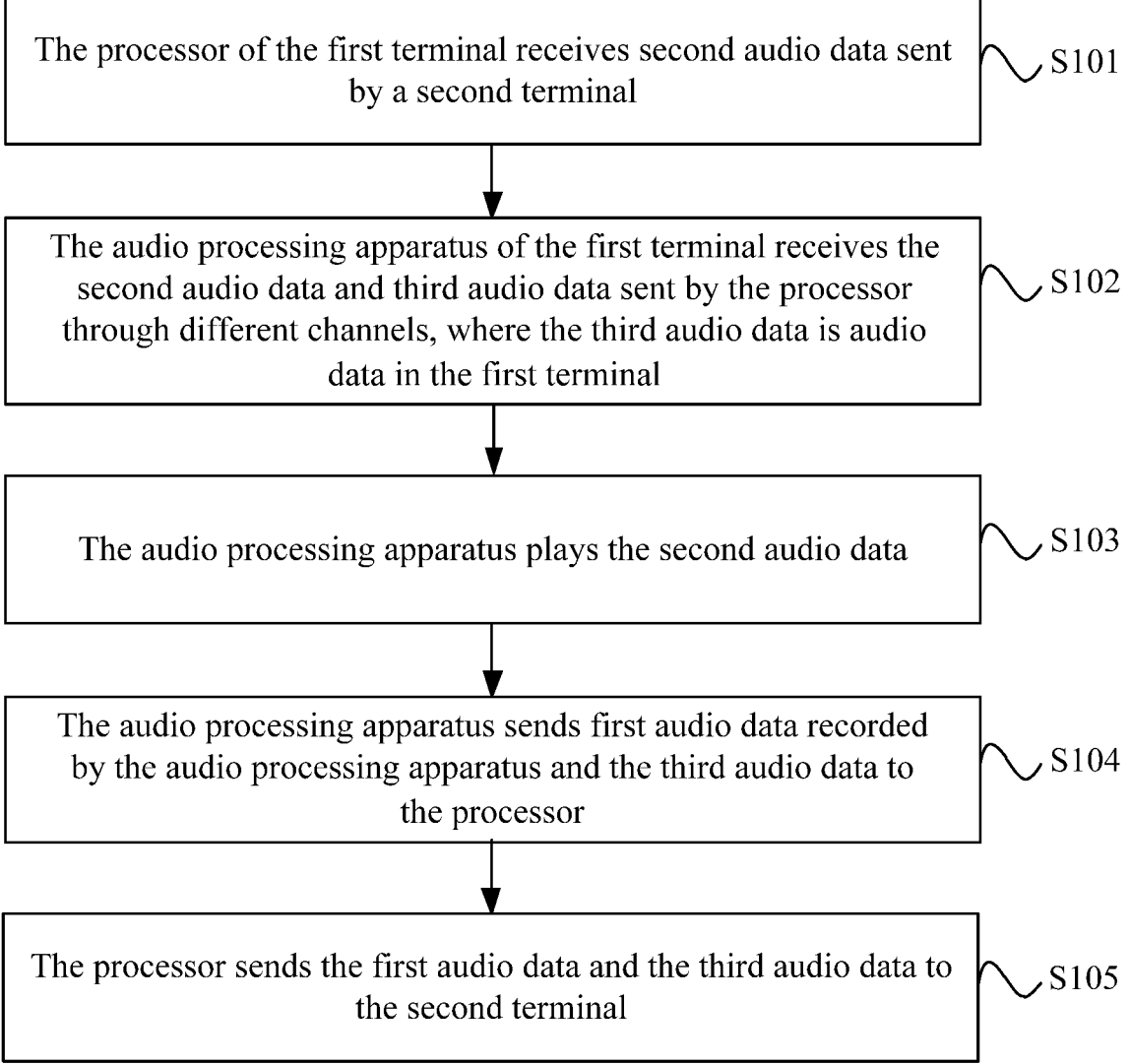

The processor of the first terminal receives second audio data sent by a second terminal ⟿ S101

The audio processing apparatus of the first terminal receives the second audio data and third audio data sent by the processor through different channels, where the third audio data is audio data in the first terminal ⟿ S102

The audio processing apparatus plays the second audio data ⟿ S103

The audio processing apparatus sends first audio data recorded by the audio processing apparatus and the third audio data to the processor ⟿ S104

The processor sends the first audio data and the third audio data to the second terminal ⟿ S105

FIG. 2

LIVESTREAMING AUDIO PROCESSING METHOD AND DEVICE

CROSS-REFERENCE TO RELATED APPLICATIONS

The present application is a National Stage of International Application No. PCT/CN2021/134163, filed on Nov. 29, 2021, which claims priority to Chinese Patent Application No. 202011458388.1, titled "Livestreaming Audio Processing Method and Device", filed on Dec. 10, 2020, both of above applications hereby incorporated by reference in their entireties.

TECHNICAL FIELD

Embodiments of the present disclosure relate to the field of computer technologies and, in particular, to a livestreaming audio processing method and device.

BACKGROUND

Livestreaming is a way of communication between a streamer and an audience. During the livestreaming, the streamer can record image data and audio data, so that the audience can see the streamer through the image data and hear the voice of the streamer through the audio data.

In the related art, the audio data recorded by the streamer includes not only the voice of the streamer but also background music, and therefore the device required by the streamer includes a first device and a second device, both of which may be a terminal such as a mobile phone or a computer. The first device is used for playing background music, and the second device is used for recording audio data, where the audio data includes the audio data of the streamer's voice recorded by an audio processing apparatus and the audio data of the background music played by the first device.

However, the audio effect of the above-mentioned solution is poor.

SUMMARY

The embodiments of the present disclosure provide a livestreaming audio processing method and device to overcome the problem of poor audio effects in existing solutions.

In a first aspect, an embodiment of the present disclosure provides a livestreaming audio processing method, which is applied to a first terminal, and the method includes:

receiving, by a processor of the first terminal, second audio data sent by a second terminal;

receiving, by an audio processing apparatus of the first terminal, the second audio data and third audio data sent by the processor through different channels, where the third audio data is audio data in the first terminal;

playing, by the audio processing apparatus, the second audio data;

sending, by the audio processing apparatus, first audio data recorded by the audio processing apparatus and the third audio data to the processor; and sending, by the processor, the first audio data and the third audio data to the second terminal.

In a second aspect, an embodiment of the present disclosure provides a first terminal, including: a processor and an audio processing apparatus;

the processor is configured to receive second audio data sent by a second terminal;

the audio processing apparatus is configured to receive the second audio data and third audio data sent by the processor through different channels, where the third audio data is audio data in the first terminal;

the audio processing apparatus is configured to play the second audio data;

the audio processing apparatus is configured to send first audio data recorded by the audio processing apparatus and the third audio data to the processor; and the processor is configured to send the first audio data and the third audio data to the second terminal.

In a third aspect, an embodiment of the present disclosure provides a computer-readable storage medium, which stores thereon computer-executable instructions, and when a processor and an audio processing apparatus execute the computer-executable instructions, the method according to the first aspect mentioned above and various possible designs thereof is implemented.

In a fourth aspect, an embodiment of the present disclosure provides a computer program product, which includes a computer program carried on a non-transitory computer-readable medium, and when the computer program is executed by a processor, the method according to the first aspect mentioned above and various possible designs thereof is carried out.

In a fifth aspect, an embodiment of the present disclosure provides a computer program, and the computer program is used to implement the method according to the first aspect mentioned above and various possible designs thereof.

According to the livestreaming audio processing method and device provided by the embodiments of the present disclosure, the method can include: the processor of the first terminal receives the second audio data sent by the second terminal; the audio processing apparatus of the first terminal receives the second audio data and the third audio data sent by the processor through different channels, where the third audio data is audio data in the first terminal; the audio processing apparatus plays the second audio data; the audio processing apparatus sends the first audio data recorded by the audio processing apparatus and the third audio data to the processor; and the processor sends the first audio data and the third audio data to the second terminal. The method in the embodiments of the present disclosure can implement livestreaming through the first terminal, where the third audio data is the background music data in the first terminal, and the second audio data is the voice data of a streamer or audience received by the first terminal, and the first audio data is the voice data of a local streamer recorded by the first terminal. As such, because the third audio data is an original audio data source, the background music does not contain environmental noise therein; in addition, because the third audio data is not played, the audio effect of the background music will not be caused to be poor by poor quality of a playback device, which facilitates the improvement of the audio effect of the livestreaming.

BRIEF DESCRIPTION OF DRAWINGS

In order to more clearly describe the technical solutions in the embodiments of the present disclosure or the related art, the following will briefly introduce the drawings that need to be used in the description of the embodiments or the related art. Obviously, the drawings in the following description are some embodiments of the present disclosure. For those of ordinary skill in the art, other drawings can be obtained based on these drawings without creative efforts.

FIG. 2 is a flowchart of steps of a livestreaming audio processing method provided by an embodiment of the present disclosure;

DESCRIPTION OF EMBODIMENTS

In order to make the purpose, technical solutions and advantages of the embodiments of the present disclosure clearer, the technical solutions in the embodiments of the present disclosure will be clearly and completely described below in conjunction with the drawings in the embodiments of the present disclosure. Obviously, the described embodiments are part of the embodiments of the present disclosure, but not all of them. Based on the embodiments in the present disclosure, all other embodiments obtained by persons of ordinary skill in the art without creative efforts fall within the protection scope of the present disclosure.

Figure 1A:
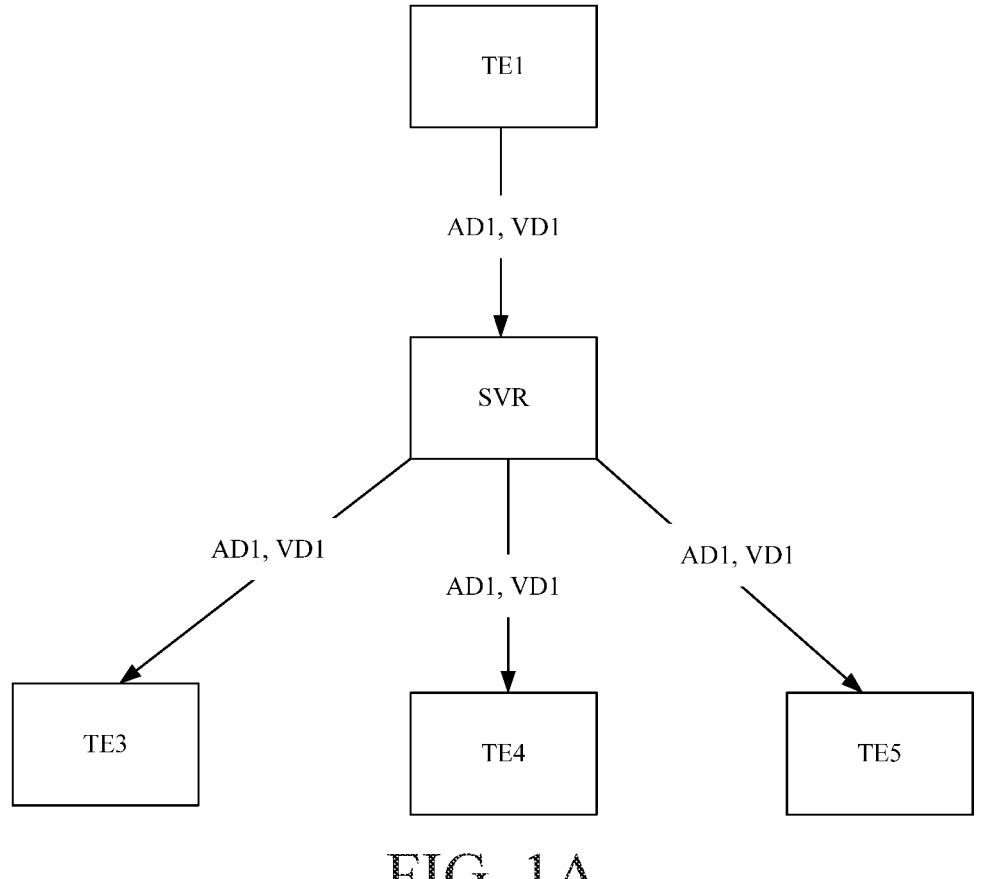
FIG. 1A and FIG. 1B are schematic diagrams of two application scenarios of a livestreaming audio processing method provided by an embodiment of the present disclosure.
Figure 1B:
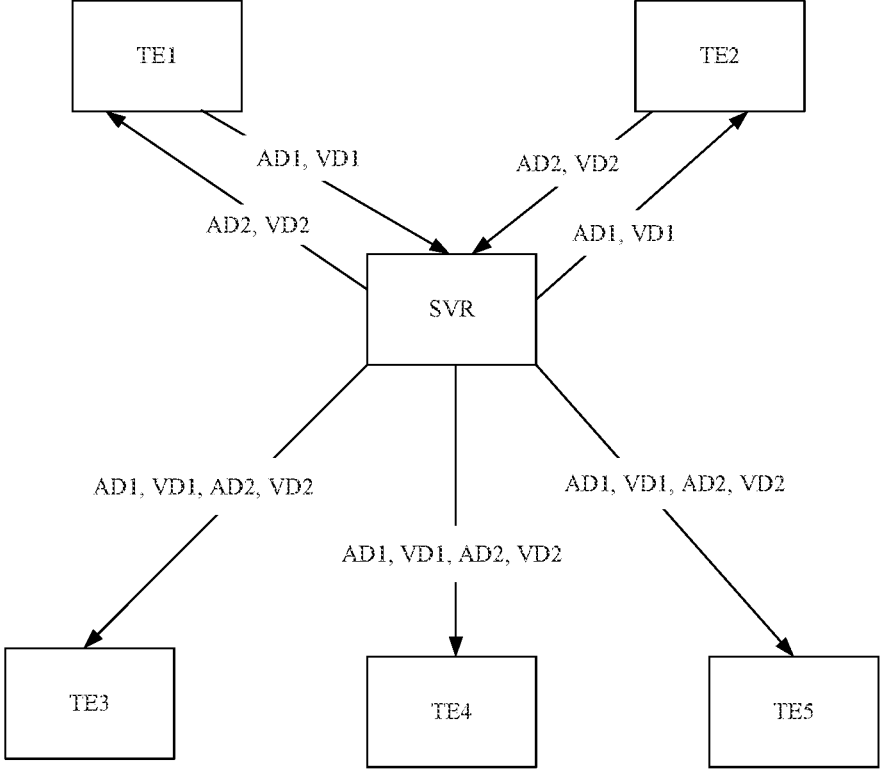

The embodiments of the present disclosure may be applied to livestreaming scenarios. FIG. 1A illustratively shows a livestreaming scenario based on one streamer and three viewers, and FIG. 1B illustratively shows a livestreaming scenario based on two streamers and three viewers, and the livestreaming in FIG. 1B may also be called joint livestreaming. The joint livestreaming means that at least two streamers perform livestreaming to the audience together, and during the livestreaming, the audio data and image data of each streamer can be sent to the audience, so that the audience can not only view the streamers, but also hear the voice of the streamers.

In FIG. 1A or FIG. 1B, TE1 and TE2 are terminal devices used by the streamers, TE3, TE4 and TE5 are terminal devices used by the viewers respectively, and the terminal devices are connected communicatively through a server SVR. TE1 can acquire the voice of streamer ANC1 as audio data AD1, and TE1 can also acquire an image of ANC1, an image of an item shown by ANC1 and an image of the surroundings where ANC1 is located as image data VD1. TE2 can acquire the voice of streamer ANC2 as audio data AD2, and TE2 can also acquire an image of ANC2, an image of an item shown by ANC2 and an image of the surroundings where ANC2 is located as image data VD2.

There is one streamer ANC1 in the livestreaming scenario shown in FIG. 1A. In the process of livestreaming shown in FIG. 1A, TE1 sends AD1 and VD1 to SVR, and SVR sends AD1 and VD1 to TE3, TE4 and TE5, so that the viewer AUD1 using TE3, the viewer AUD2 using TE4 and the viewer AUD3 using TE5 can not only see ANC1, the item shown by ANC1, and the surroundings where ANC1 is located, but also hear the voice of ANC1.

There are two streamers ANC1 and ANC2 in the live broadcast scenario shown in FIG. 1B. In the process of livestreaming shown in FIG. 1B, TE1 sends AD1 and VD1 to SVR, and SVR sends AD1 and VD1 to TE2, TE3, TE4 and TE5, so that ANC2, the viewer AUD1 using TE3, the viewer AUD2 using TE4 and the viewer AUD3 using TE5 can not only see ANC1, the item shown by ANC1, and the surroundings where ANC1 is located, but also hear the voice of ANC1. Furthermore, TE2 sends AD2 and VD2 to SVR, and SVR forwards AD2 and VD2 to TE1, TE3, TE4 and TE5, so that ANC1, the viewer AUD1 using TE3, the viewer AUD2 using TE4 and the viewer AUD3 using TE5 can not only see ANC2, the item shown by ANC2, the surroundings where ANC2 is located, but also hear the voice of ANC2.

The foregoing server may be one or more devices in a wireless communication network, such as a base station, a core network device, and the like.

Under the above-mentioned livestreaming scenarios, in order to enrich the livestreaming effect, the terminal device used by the streamer in the related art can not only record the voice of the streamer, but also record the music data being played as the background music of the streamer's voice. The terminal device sends the obtained streamer's voice and background music to the terminal devices of other streamers and the terminal devices used by the audience, so that other streamers and the audience can hear the voice of the streamer with the background music.

However, in the related art, the background music of the streamer's voice is obtained by recording the music data being played, which will cause the background music to contain noises such as the environmental noise, affecting the audio effect of the livestreaming. In addition, if the quality of the device playing the background music is poor, the quality of the music playback will be poor, which will also affect the audio effect of the livestreaming.

In order to solve the technical problem mentioned above, an embodiment of the present disclosure provides an audio processing method, which can be applied to a first terminal, where the first terminal includes a processor and an audio processing apparatus. During the livestreaming, the processor can send second audio data of a second terminal, and third audio data in the first terminal to the audio processing apparatus through different channels. The audio processing apparatus distinguishes between the second audio data and the third audio data by the channels, so that first audio data and the third audio data can be sent to the second terminal by the processor, and the second audio data can be played. A common audio processing apparatus may be a sound card.

The first terminal in the embodiments of the present disclosure is a terminal used by one of the streamers, for example, TE1 or TE2 in FIG. 1A or FIG. 1B. The second terminal is a terminal used by another streamer or a terminal used by a viewer, and for example, as shown in FIG. 1B, when TE1 is the first terminal, the second terminal may be TE2, TE3, TE4 or TE5.

The first audio data of the first terminal is the voice of the streamer using the first terminal, the second audio data of the second terminal is the voice of the streamer or the viewer using the second terminal, and the third audio data of the first terminal is background music. As such, because the obtained third audio data is an original audio data source, the background music does not contain environmental noise; in addition, because the third audio data is not played, the audio effect of the background music will not be caused to be poor by poor quality of a playback device, which facilitating the improvement of the audio effect of the livestreaming.

The technical solution of the present disclosure and how the technical solution of the present disclosure solves the above-mentioned technical problem will be described in detail below with specific embodiments. The following specific embodiments may be combined with each other, and the same or similar concepts or processes may not be repeated in some embodiments. The embodiments of the present disclosure will be described below with reference to the accompanying drawings.

Referring to FIG. 2, FIG. 2 is a flowchart of steps of a livestreaming audio processing method provided by an embodiment of the present disclosure. The method in this embodiment may be applied in the first terminal.

Figure 3:
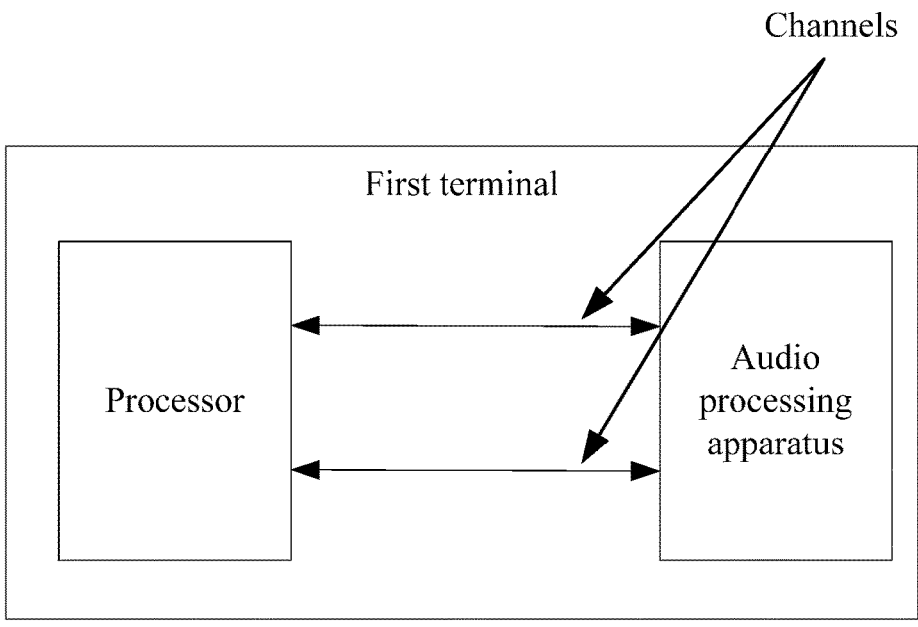
FIG. 3 is a schematic diagram of two channels of a first terminal provided by an embodiment of the present disclosure.

The first terminal can include a processor and an audio processing apparatus, and audio data is sent between the processor and the audio processing apparatus through a plurality of channels. As shown in FIG. 3, a schematic diagram of two channels of the first terminal is illustratively shown. The processor may send the second audio data to the audio processing apparatus through one channel in FIG. 3, and send the third audio data to the audio processing apparatus through another channel in FIG. 3. The audio processing apparatus may send the first audio data to the processor through one channel in FIG. 3, and send the third audio data to the processor through another channel in FIG. 3.

The livestreaming audio processing method in FIG. 2 includes S101 to S105.

S101: the processor of the first terminal receives second audio data sent by a second terminal.

The second audio data is audio data generated by the second terminal. After the processor of the first terminal receives the second audio data, the processor of the first terminal sends it to the audio processing apparatus of the first terminal through a channel.

S102: the audio processing apparatus of the first terminal receives the second audio data and third audio data sent by the processor through different channels, where the third audio data is audio data in the first terminal.

It can be understood that the second audio data and the third audio data occupy different channels, so that the audio processing apparatus can distinguish the received second audio data from the third audio data by the channels. When there is one piece of the second audio data, it can occupy one channel; when there is a plurality of pieces of the second audio data, it may occupy a plurality of channels; similarly, when there is one piece of the third audio data, it can occupy one channel, and when there is a plurality of pieces of third audio data, it may occupy a plurality of channels. For example, if there are four channels CH1 to CH4, and the number of pieces of the second audio data and the number of pieces of the third audio data are both two, then the two pieces of the second audio data may occupy the channel CH1 and the channel CH2 respectively, while the two pieces of the third audio data may occupy the channel CH3 and the channel CH4 respectively; and if there are two channels CH1 to CH2, and the number of pieces of the second audio data and the number of pieces of the third audio data are both one, then the second audio data may occupy the channel CH1, while the third audio data may occupy the channel CH2.

The third audio data may be audio data pre-recorded by the first terminal, for example, audio data obtained by pre-recording music, speech, etc., or may be audio data pre-downloaded by the first terminal, for example, music data downloaded through an application program. Further, the third audio data may also be audio data with a playback frequency or a number of playback times greater than or equal to a preset threshold in the first terminal, audio data being played in the first terminal, or audio data specified by a user in the first terminal.

S103: the audio processing apparatus plays the second audio data.

It can be understood that when the second terminal is a terminal device used by another streamer, the second audio data is the voice of another streamer, and playing the second audio data can enable the streamer of the first terminal to hear the voice of another streamer; when the second terminal is a terminal device used by a viewer, the second audio data is the voice of the viewer, and playing the second audio data can enable the streamer of the first terminal to hear the interactive voice of the viewer.

S104: the audio processing apparatus sends first audio data recorded by the audio processing apparatus and the third audio data to the processor.

The audio processing apparatus of the first terminal may record the first audio data through a microphone built-in the audio processing apparatus, and the first audio data may include but not be limited to: the voice of the streamer of the first terminal and other sounds in the surroundings. The audio processing apparatus of the first terminal can send the first audio data and the third audio data to the processor of the first terminal through different channels or send the first audio data and the third audio data to the processor of the first terminal after mixing the first audio data and the third audio data.

It should be noted that, after recording the first audio data and before sending the first audio data recorded and the third audio data to the processor of the first terminal, the audio processing apparatus of the first terminal may perform preset processing on the first audio data, and send the processed audio data as new first audio data and the third audio data to the processor of the first terminal.

The preset processing may include but not be limited to: adding sound effect data, adjusting volume, and adjusting frequency. Specifically, the sound effect data may be audio data such as clapping, giving a like.

S105: the processor sends the first audio data and the third audio data to the second terminal.

In an implementation, the processor of the first terminal may send the first audio data and the third audio data to the second terminal through the server SVR in FIG. 1A or FIG. 1B.

In the embodiment of the present disclosure, the second audio data generated by the second terminal will not be sent back to the second terminal. In this way, not only transmission resources can be saved, but also echoes of the second audio data can be prevented from being generated by the second terminal.

Figure 4:
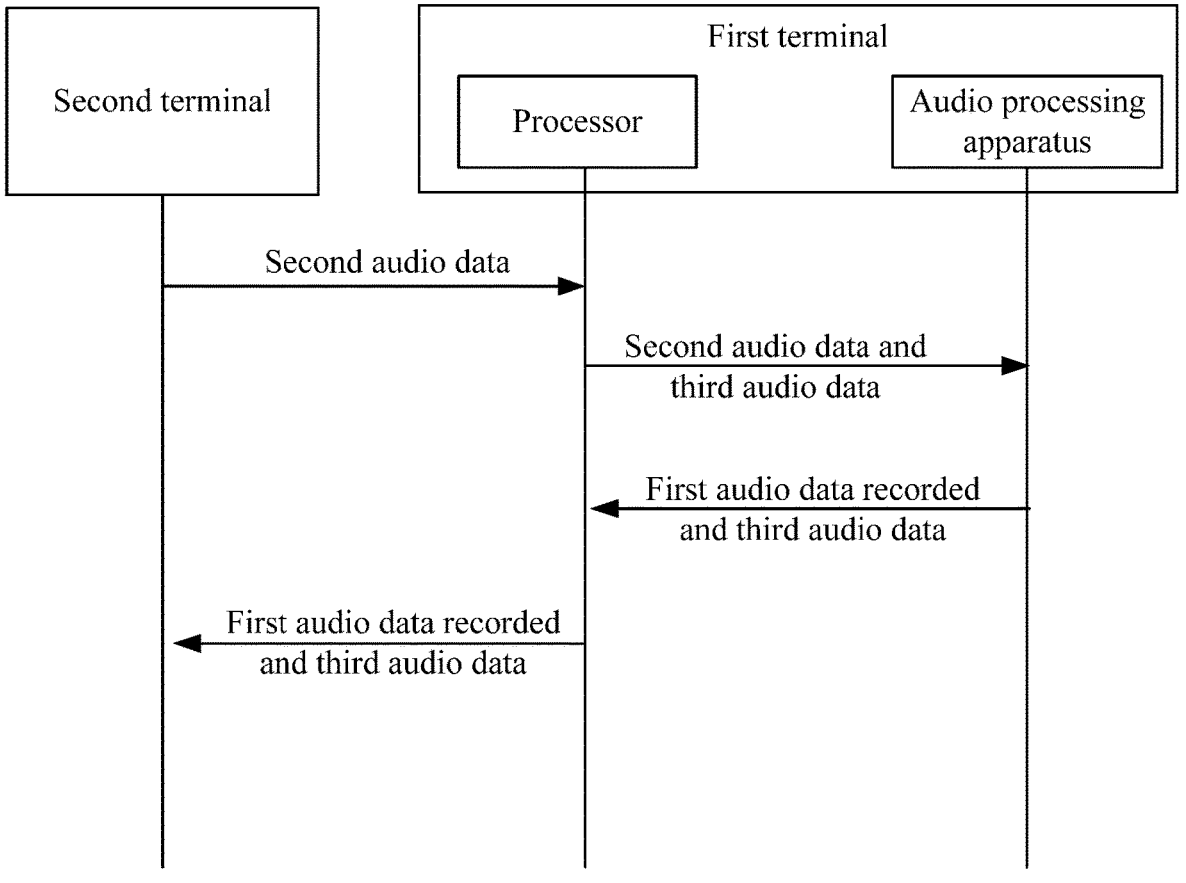
FIG. 4 is a schematic diagram of data flow of a livestreaming audio processing method provided by an embodiment of the present disclosure.

Reference may be made to those shown in FIG. 4 for the data flow of audio data in the process of audio processing from S101 to S105 mentioned above, where the second terminal sends the generated second audio data to the processor of the first terminal, and the processor of the first terminal sends the third audio data in the first terminal and the second audio data to the audio processing apparatus of the first terminal, the audio processing apparatus of the first terminal sends the first audio data recorded and the third audio data to the processor of the first terminal, and the processor of the first terminal sends the first audio data recorded and the third audio data to the second terminal.

Of course, it can be understood that the communication between the two terminal devices mentioned above needs to go through the server as shown in FIG. 1, and FIG. 4 only shows the data flow between the terminal devices, and the server therebetween is omitted.

Optionally, the S103 may include S1031: the audio processing apparatus plays first mixing data obtained by mixing the second audio data and at least one of the following: the first audio data recorded by the audio processing apparatus, or the third audio data.

The mixing can superimpose at least two pieces of audio data together according to time stamps to obtain one piece of audio data, that is, the duration of the audio data after the mixing is the same as that of the audio data before the mixing, and a point of the audio data after mixing at a moment is obtained by superimposing points of audio data before mixing at that moment. It can be understood that two pieces of audio data can be regarded as two data sources, and the mixing is to mix at least two data sources into one data source, where one data source can be transmitted in one channel, while at least two data sources need to be transmitted in at least two channels to avoid interfering with each other.

In the embodiment of the present disclosure, when the audio processing apparatus of the first terminal plays the first mixing data on the first terminal, the streamer of the first terminal can hear the playback effect of the first mixing data, that is, the livestreaming effect, which is convenient for the streamer of the first terminal to make timely adjustment according to the livestreaming effect.

When the number of pieces of the second audio data and the number of pieces of the third audio data are both at least two, the process of the processor sending the second audio data and the third audio data to the audio processing apparatus through at least four channels is described below through S1021, and the process of the processor sending the second audio data and the third audio data to the audio processing apparatus through two channels is described through S106 and S1022.

Optionally, in an example of the embodiment of the present disclosure, there are at least two pieces of the second audio data and at least two pieces of the third audio data, and S102 includes S1021.

S1021: the audio processing apparatus receives the at least two pieces of the second audio data sent by the processor through at least two channels respectively, and the at least two pieces of the third audio data sent by the processor through at least two channels respectively, where each channel is used to send one piece of the second audio data or one piece of the third audio data.

Figure 5:
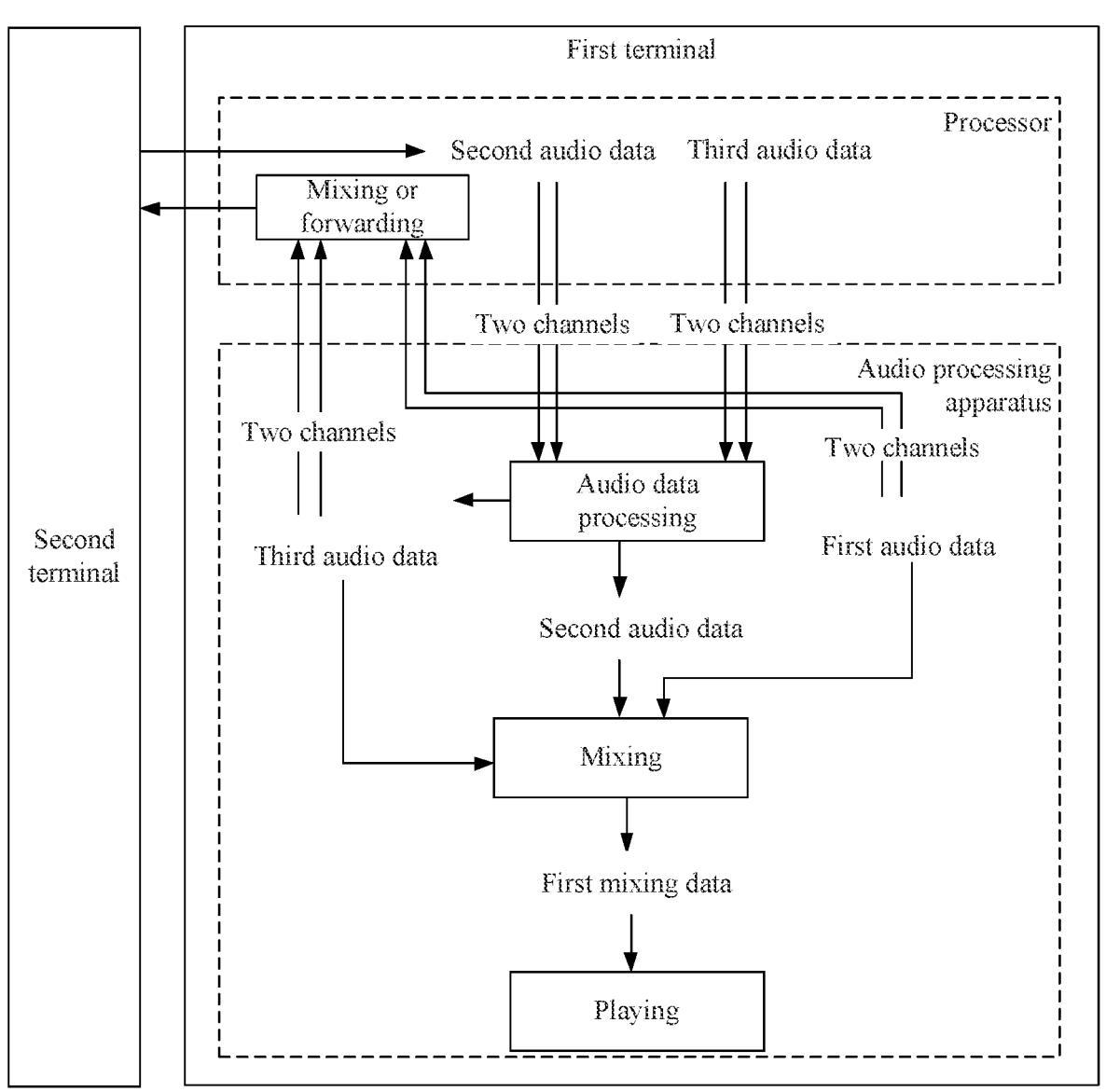
FIG. 5 and FIG. 6 are two schematic process diagrams of a livestreaming audio processing method provided by an embodiment of the present disclosure.

In the embodiment of the present disclosure, there may be at least two pieces of the second audio data, and there also may be at least two pieces of the third audio data, and therefore both need to occupy at least two channels, and at least four channels in total are needed. At that point, if there are at least four channels, the number of channels is sufficient, and therefore there is no need to mix the second audio data or the third audio data, and each piece of audio data can be sent by occupying one channel alone. For example, as shown in FIG. 5, there are two pieces of the second audio data and two pieces of the third audio data, and the second audio data and the third audio data each occupy two channels.

Optionally, in an example of the embodiment of the present disclosure, there are at least two pieces of the second audio data and at least two pieces of the third audio data, and the method further includes S106: the processor mixes the at least two pieces of the second audio data into second mixing data, and the at least two pieces of the third audio data into third mixing data; and based on S106 mentioned above, S102 mentioned above includes S1022: the audio processing apparatus receives the second mixing data sent by the processor through one channel, and the third mixing data sent by the processor through another channel.

Figure 6:
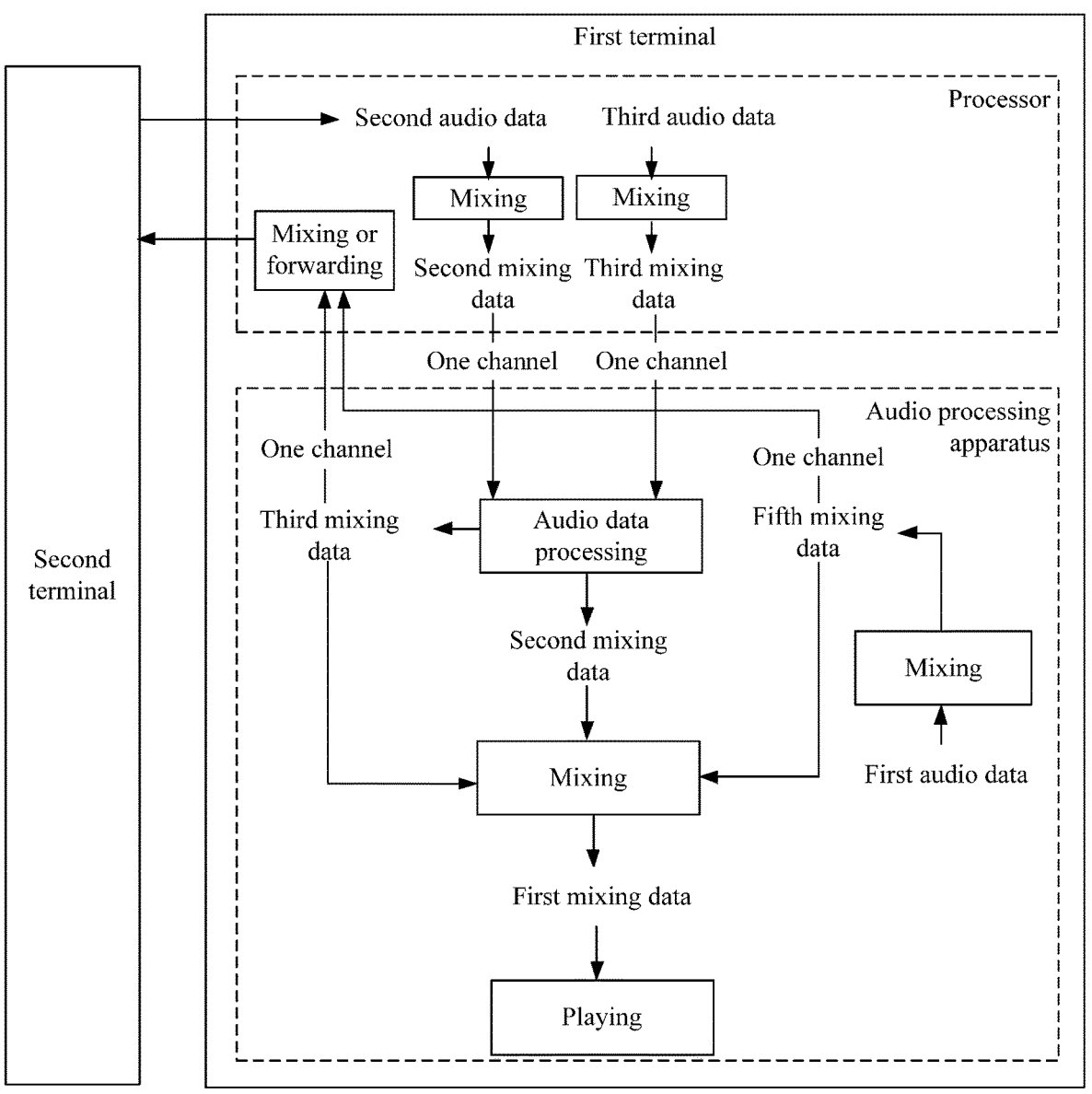

It can be understood that when the audio processing apparatus has only two channels, it cannot send the at least two pieces of the second audio data and the at least two pieces of the third audio data, and therefore needs to mix the at least two pieces of the second audio data into the second mixing data, and mix the at least two pieces of the third audio data into the third mixing data, where the second mixing data and the third mixing data each are one data source, and they each need to occupy one channel. As shown in FIG. 6, the processor of the first terminal mixes the at least two pieces of the second audio data into the second mixing data, mixes the at least two pieces of the third audio data into the third mixing data, sends the second mixing data to the audio processing apparatus of the first terminal through one channel, and sends the third mixing data to the audio processing apparatus of the first terminal through another channel.

Of course, if there are more than two channels in the audio processing apparatus of the first terminal, it is also possible to select two channels therefrom to send the second mixing data and the third mixing data, so as to save channel resources.

The process of the audio processing apparatus sending data obtained by mixing the first audio data and the third audio data to the processor is described below through S1041 and S1042. Optionally, in an example of the embodiment of the present disclosure, based on S101 to S105, S1021 to S1022, and S106 mentioned above, S104 mentioned above includes S1041 to S1042.

S1041: the audio processing apparatus mixes the first audio data recorded by the audio processing apparatus and the third audio data to obtain fourth mixing data.

S1042: the audio processing apparatus sends the fourth mixing data to the processor through one channel.

Based on S1041 to S1042 mentioned above, S105 mentioned above includes S1051: the processor sends the fourth mixing data to the second terminal.

It can be understood that S1041 may be combined with S1021 to obtain the following solution: the processor of the first terminal sends the at least two pieces of the second audio data to the audio processing apparatus of the first terminal through at least two channels, the processor of the first terminal sends the at least two pieces of the third audio data to the audio processing apparatus of the first terminal through at least two other channels, and the audio processing apparatus of the first terminal, after receiving the second audio data and the third audio data, mixes one or more pieces of the first audio data recorded and the at least two pieces of the third audio data into the fourth mixing data and then the fourth mixing data is sent to the second terminal. S1041 may also be combined with S106 and S1022 to obtain the following solution: the processor of the first terminal sends the second mixing data obtained by mixing the at least two pieces of the second audio data to the audio processing apparatus of the first terminal through one channel, the processor of the first terminal sends the third mixing data obtained by mixing the at least two pieces of the third audio data to the audio processing apparatus of the first terminal through another channel, and the audio processing apparatus of the first terminal, after receiving the second mixing data and the third mixing data, mixes one or more pieces of the first audio data recorded and the one piece of the third mixing data into the fourth mixing data and then the fourth mixing data is sent to the second terminal.

The embodiment of the present disclosure can send, through one channel, the fourth mixing data obtained by mixing the first audio data and the third audio data, which is applicable to a scenario where there is only one idle channel.

When the number of pieces of the first audio data and the number of pieces of the third audio data both are at least two, a process of the audio processing apparatus sending, through two channels, fifth mixing data obtained by mixing the at least two pieces of the first audio data and the third mixing data obtained by mixing the at least two pieces of the third audio data to the processor is described below through S1043 to S1044, where the process is based on S1021.

Optionally, in an example of the embodiment of the present disclosure, based on S1021 mentioned above, S104 mentioned above includes S1043 to S1044.

S1043: the audio processing apparatus mixes the at least two pieces of the first audio data recorded by the audio processing apparatus into the fifth mixing data, and mixes the at least two pieces of the third audio data into the third mixing data.

S1044: the audio processing apparatus sends the fifth mixing data and the third mixing data to the processor through two channels respectively.

Based on S1043 mentioned above, t S105 mentioned above includes: the processor sends the fifth mixing data and the third mixing data to the second terminal.

It can be understood that S1043 to S1044, and S105 may be combined with S1021 to obtain the following solution: the processor of the first terminal sends the at least two pieces of the second audio data to the audio processing apparatus of the first terminal through at least two channels, the processor of the first terminal sends the at least two pieces of the third audio data to the audio processing apparatus of the first terminal through at least two other channels, the audio processing apparatus of the first terminal, after receiving the second audio data and the third audio data, mixes the recorded one or more pieces of the first audio data into the fifth mixing data, mixes the at least two pieces of the third audio data into the third mixing data, and sends the fifth mixing data and the third mixing data to the processor through two channels respectively, and the processor sends the fifth mixing data and the third mixing data to the second terminal.

When the number of pieces of the first audio data and the number of pieces of the third audio data both are at least two, a process of the audio processing apparatus sending each piece of the first audio data and each piece of the third audio data to the processor through one channel respectively is described below through S1045, where the process is based on S1021.

Optionally, in an example of the embodiment of the present disclosure, based on S1021 mentioned above, S104 mentioned above includes S1045: the audio processing apparatus sends the at least two pieces of the first audio data recorded by the audio processing apparatus to the processor through at least two channels respectively, and sends the at least two pieces of the third audio data to the processor through at least two channels, where each of the channels is used to send one piece of the first audio data or one piece of the third audio data.

It can be understood that S1045 may be combined with S1021 to obtain the following solution: the processor of the first terminal sends the at least two pieces of the second audio data to the audio processing apparatus of the first terminal through at least two channels, the processor of the first terminal sends the at least two pieces of the third audio data to the audio processing apparatus of the first terminal through at least two other channels, the audio processing apparatus of the first terminal, after receiving the second audio data and the third audio data, sends at least two pieces of the first audio data recorded and the at least two pieces of the third audio data to the processor of the first terminal through at least four channels, and the processor sends the at least two pieces of the first audio data and the at least two pieces of the third audio data to the second terminal.

Illustratively, when the number of pieces of the first audio data, the number of pieces of the second audio data, and the number of pieces of the third audio data are all two, referring to what FIG. 5 shows, the embodiment of the present disclosure provides an audio processing process based on four channels, and the process in FIG. 5 is implemented through S1021 and S1043 on the basis of the aforementioned S101 to S105. In FIG. 5, audio data is sent between the processor of the first terminal and the audio processing apparatus of the first terminal through four channels. As shown in FIG. 5, firstly, the processor of the first terminal sends, to the audio processing apparatus of the first terminal through two channels, two pieces of the second audio data sent by the second terminal, and at the same time, the processor of the first terminal sends two pieces of the third audio data in the first terminal to the audio processing apparatus of the first terminal through two channels; then, the audio processing apparatus of the first terminal obtains the two pieces of the second audio data and the two pieces of the third audio data from the four channels through audio data processing; afterwards, on the one hand, the audio processing apparatus of the first terminal mixes the first audio data, the second audio data and the third audio data into the first mixing data and plays it thereafter; on the other hand, the audio processing apparatus of the first terminal also sends the two pieces of the first audio data to the processor of the first terminal through two channels, and sends the two pieces of the third audio data to the processor of the first terminal through two channels; finally, the processor of the first terminal mixes the two pieces of the first audio data and the two pieces of the third audio data and then sends them to the second terminal, or directly forwards them to the second terminal.

When the processor receives the first audio data and the third audio data from different channels, it may mix the first audio data and the third audio data and then send them to the second terminal. Of course, it may also directly send the first audio data and the third audio data to the second terminal.

When the number of pieces of the first audio data and the number of pieces of the third audio data both are at least two, the process of the audio processing apparatus sending, through two channels, the fifth mixing data obtained by mixing the at least two pieces of the first audio data and the third mixing data obtained by mixing the at least two pieces of the third audio data to the processor is described below through S1046 to S1047, where the process is based on S1022.

Optionally, in an example of the embodiment of the present disclosure, based on S1022 mentioned above, S104 mentioned above includes S1046 to S1047.

S1046: the audio processing apparatus mixes at least two pieces of the first audio data recorded by the audio processing apparatus into fifth mixing data.

S1047: the audio processing apparatus sends the fifth mixing data to the processor through one channel, and sends the third mixing data to the processor through another channel.

Based on S1046 and S1047 mentioned above, S105 mentioned above includes: the processor sends the fifth mixing data and the third mixing data to the second terminal.

It can be understood that S1046, S1047 and S105 may be combined with S106 and S1022 to obtain the following solution: the processor of the first terminal sends the second mixing data obtained by mixing at least two pieces of the second audio data to the audio processing apparatus of the first terminal through one channel, and the processor of the first terminal sends the third mixing data obtained by mixing at least two pieces of the third audio data to the audio processing apparatus of the first terminal through another channel. The audio processing apparatus of the first terminal, after receiving the second mixing data and the third mixing data, sends one piece of the third mixing data and the fifth mixing data obtained by mixing at least two pieces of the first audio data recorded to the processor of the first terminal through two channels respectively. The processor sends the fifth mixing data and the third mixing data to the second terminal.

Illustratively, when the number of pieces of the first audio data, the number of pieces of the second audio data, and the number of pieces of the third audio data are all two, referring to what FIG. 6 shows, the embodiment of the present disclosure provides an audio processing process based on two channels, and the process in FIG. 6 is implemented through S106, S1022, and S1046, S1047 on the basis of the aforementioned S101 to S105. In FIG. 6, audio data is sent between the processor of the first terminal and the audio processing apparatus of the first terminal through two channels. As shown in FIG. 6, firstly, the processor of the first terminal sends, to the audio processing apparatus of the first terminal through one channel, the second mixing data obtained by mixing two pieces of the second audio data sent by the second terminal, and at the same time, sends the third mixing data obtained by mixing two pieces of the third audio data in the first terminal to the audio processing apparatus of the first terminal through another channel; then, the audio processing apparatus of the first terminal obtains the second mixing data and the third mixing data from the two channels through audio data processing; afterwards, on the one hand, the audio processing apparatus of the first terminal mixes the second mixing data, the third mixing data, and the fifth mixing data that is obtained by mixing the first audio data, into the first mixing data and plays it thereafter; on the other hand, the audio processing apparatus of the first terminal also sends the fifth mixing data to the processor of the first terminal through one channel, and sends the third mixing data to the processor of the first terminal through another one channel; finally, the processor of the first terminal mixes the fifth mixing data and the third mixing data and then sends them to the second terminal, or directly forwards them to the second terminal.

When the number of pieces of the first audio data and the number of pieces of the third audio data both are at least two, the process of the audio processing apparatus sending each piece of the first audio data and each piece of the third audio data to the processor through one channel based on S1022 is described through S1048.

Optionally, in an example of the embodiment of the present disclosure, based on S1022 mentioned above, there are at least two pieces of the first audio data, and S104 mentioned above includes S1048: the audio processing apparatus sends the at least two pieces of the first audio data recorded by the audio processing apparatus through at least two channels respectively, and sends the third mixing data to the processor through one channel, where each channel is used to sends one piece of the first audio data or one piece of the third mixing data;

S105 mentioned above includes: the processor sends the at least two pieces of the first audio data and the third mixing data to the second terminal.

It can be understood that S1048 may be combined with S106 and S1022 to obtain the following solution: the processor of the first terminal sends the second mixing data obtained by mixing at least two pieces of the second audio data to the audio processing apparatus of the first terminal through one channel, and the processor of the first terminal sends the third mixing data obtained by mixing at least two pieces of the third audio data to the audio processing apparatus of the first terminal through another channel. The audio processing apparatus of the first terminal, after receiving the second mixing data and the third mixing data, sends the at least two pieces of the first audio data recorded and the third mixing data to the processor of the first terminal each through one channel. The processor sends at least two pieces of the first audio data and the third mixing data to the second terminal.

In summary, the livestreaming audio processing method provided by the embodiments can implement livestreaming through the first terminal, where the third audio data is the background music data in the first terminal, and the second audio data is the voice data of another streamer or audience received by the first terminal, and the first audio data is the voice data of the local streamer recorded by the first terminal. As such, because the third audio data is the original audio data source, the background music does not contain environmental noise therein; in addition, because the third audio data is not played, the audio effect of the background music will not be caused to be poor by poor quality of a playback device, which facilitates the improvement of the audio effect of the livestreaming.

Figure 7:
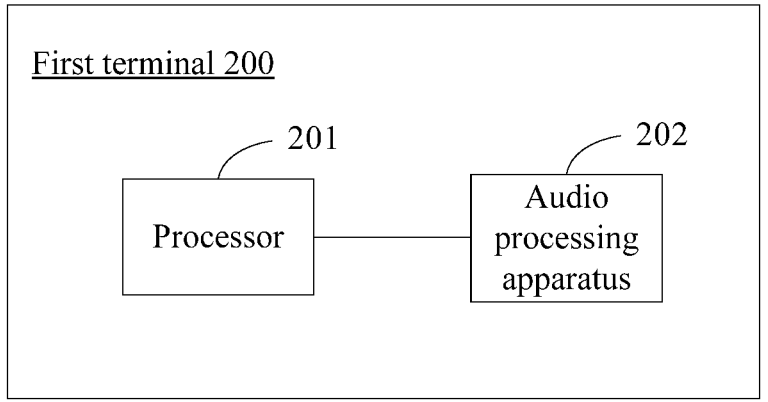
FIG. 7 is a schematic structural diagram of a first terminal provided by an embodiment of the present disclosure.

Corresponding to the livestreaming audio processing method of the embodiments in above paragraphs, FIG. 7 is a structural block diagram of a first terminal provided by an embodiment of the present disclosure. For ease of description, only the parts related to the embodiments of the present disclosure are shown. Referring to FIG. 7, the first terminal 200 includes: a processor 201 and an audio processing apparatus 202.

The processor 201 is configured to receive second audio data sent by a second terminal; the audio processing apparatus 202 is configured to receive the second audio data and third audio data sent by the processor 201 through different channels, where the third audio data is audio data in the first terminal;

the audio processing apparatus 202 is configured to play the second audio data;

the audio processing apparatus 202 is configured to send first audio data recorded by the audio processing apparatus 202 and the third audio data to the processor 201; and the processor 201 is configured to send the first audio data and the third audio data to the second terminal.

Optionally, in an example of the embodiment of the present disclosure, the audio processing apparatus 202 is further configured to play first mixing data obtained by mixing the second audio data and at least one of the following: the first audio data recorded by the audio processing apparatus 202 or the third audio data.

Optionally, in an example of the embodiment of the present disclosure, there are at least two pieces of the second audio data and at least two pieces of the third audio data, and the audio processing apparatus 202 is further configured to:

receive the at least two pieces of the second audio data respectively sent by the processor 201 through at least two channels, and the at least two pieces of the third audio data respectively sent by the processor 201 through at least two channels, where each channel is used to send one piece of the second audio data or one piece of the third audio data.

Optionally, in an example of the embodiment of the present disclosure, there are at least two pieces of the second audio data and at least two pieces of the third audio data, and the processor 201 is further configured to:

mix the at least two pieces of the second audio data into second mixing data, and mix the at least two pieces of the third audio data into third mixing data;

the audio processing apparatus 202 is also configured to:

receive the second mixing data sent by the processor 201 through one channel, and the third mixing data sent by the processor 201 through another channel.

Optionally, in an example of the embodiment of the present disclosure, the audio processing apparatus 202 is further configured to:

mix the first audio data recorded by the audio processing apparatus 202 and the third audio data to obtain fourth mixing data; and send the fourth mixing data to the processor 201 through one channel; and the processor 201 is further configured to: send the fourth mixing data to the second terminal.

Optionally, in an example of the embodiment of the present disclosure, there are at least two pieces of the first audio data, and the audio processing apparatus 202 is further configured to:

mix the at least two pieces of the first audio data recorded by the audio processing apparatus 202 into fifth mixing data, and mix the at least two pieces of the third audio data into third mixing data; and send the fifth mixing data and the third mixing data to the processor 201 through two channels respectively; and the processor 201 is further configured to: send the fifth mixing data and the third mixing data to the second terminal.

Optionally, in an example of the embodiment of the present disclosure, there are at least two pieces of the first audio data and at least two pieces of the third audio data, and the audio processing apparatus 202 is further configured to:

send the at least two pieces of the first audio data recorded by the audio processing apparatus 202 to the processor 201 through at least two channels respectively, and send the at least two pieces of the third audio data to the processor 201 through at least two channels, where each of the channels is used to send one piece of the first audio data or one piece of the third audio data.

Optionally, in an example of the embodiment of the present disclosure, there are at least two pieces of the first audio data and at least two pieces of the third audio data, and the audio processing apparatus 202 is further configured to:

mix the at least two pieces of the first audio data recorded by the audio processing apparatus 202 into fifth mixing data; and send the fifth mixing data to the processor 201 through one channel, and send the third mixing data to the processor 201 through another channel; and the processor 201 is further configured to: send the fifth mixing data and the third mixing data to the second terminal.

Optionally, in an example of the embodiment of the present disclosure, there are at least two pieces of the first audio data, and the audio processing apparatus 202 is further configured to:

send the at least two pieces of the first audio data recorded by the audio processing apparatus 202 to the processor 201 through at least two channels respectively, and send the third mixing data to the processor 201 through one channel, where each of the channels is used to send one piece of the first audio data or one piece of the third mixing data; and the processor 201 is further configured to: send the at least two pieces of the first audio data and the third mixing data to the second terminal.

The first terminal provided by this embodiment can be used to carry out the technical solutions of the foregoing method embodiments, and the implementation principles and technical effects thereof are similar, which will not be repeated here in this embodiment.

Figure 8:
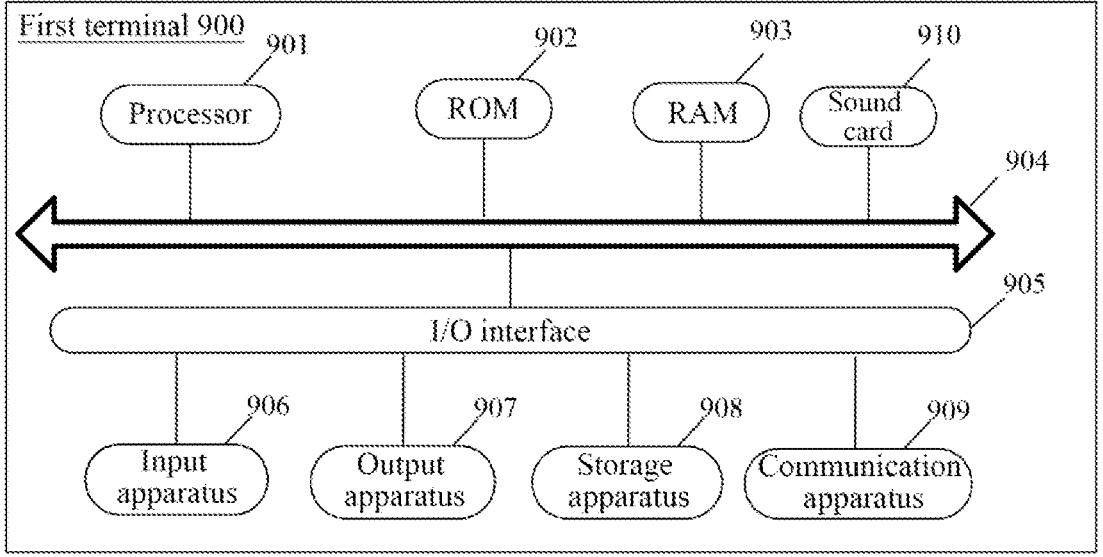
FIG. 8 is a more specific schematic structural diagram of a first terminal provided by an embodiment of the present disclosure.

Referring to FIG. 8, it shows a more specific schematic structural diagram of a first terminal 900 suitable for implementing an embodiment of the present disclosure, where the first terminal 900 may be a terminal device. The terminal device may include, but is not limited to, a mobile terminal such as a mobile phone, a laptop, a digital broadcast receiver, a personal digital assistant (Personal Digital Assistant, PDA for short), a portable android device (Portable Android Device, PAD for short), a portable media player (Portable Media Player, PMP for short), a vehicle-mounted terminal (e.g., a vehicle-mounted navigation terminal) or the like, and a fixed terminal such as a digital TV (Television), a desktop computer or the like. The first terminal shown in FIG. 8 is merely an example, and should not impose any restrictions on the function and range of use of the embodiments of the present disclosure.

As shown in FIG. 8, the first terminal 900 may include a processing apparatus (such as a central processor, a graphics processor, etc.) 901, which may perform various appropriate actions and processing according to a program stored in a read only memory (Read Only Memory, ROM for short) 902 or a program loaded from a storage apparatus 908 to a random access memory (Random Access Memory, RAM for short) 903. In the RAM 903, various programs and data required for the operation of the first terminal 900 are also stored. The processing apparatus 901, the ROM 902, and the RAM 903 are connected with each other through a bus 904. An input/output (Input/Output, I/O) interface 905 is also connected to the bus 904.

Generally, the following apparatus may be connected to the I/O interface 905: an input apparatus 906, including, for example, a touch screen, a touch panel, a keyboard, a mouse, a camera, a microphone, an accelerometer, a gyroscope, and the like; an output apparatus 907, including, for example, a liquid crystal display (Liquid Crystal Display, LCD for short), a speaker, a vibrator, and the like; a storage apparatus 908, including, for example, a magnetic tape, a hard disk, and the like; a communication apparatus 909, and an audio processing apparatus 910. The communication apparatus 909 may allow the first terminal 900 to perform wireless or wired communication with other devices to exchange data. Although FIG. 8 shows the first terminal 900 with multiple kinds of apparatuses, it should be understood that it is not required to implement or have all the apparatuses shown, and alternatively, it is possible to implement or provide more or fewer apparatuses.

In particular, according to embodiments of the present disclosure, the process described above with reference to the flowchart may be implemented as a computer software program. For example, an embodiment of the present disclosure includes a computer program product, which includes a computer program carried on a computer-readable medium, where the computer program contains program codes for executing the methods shown in the flowcharts. In such an embodiment, the computer program may be downloaded from a network through the communication apparatus 909 and installed, or installed from the storage apparatus 908, or installed from the ROM 902. When the computer program is executed by the processing apparatus 901, the above-mentioned functions defined in methods of embodiments of the present disclosure are executed.

It should be noted that, the above-mentioned computer readable medium in the present disclosure may be a computer readable signal medium, or a computer readable storage medium, or any combination of the both. The computer readable storage medium may be, for example, but not limited to, an electrical, magnetic, optical, electromagnetic, infrared, or semiconductor system, apparatus or device, or any combination of the above. A more specific example of the computer readable storage medium may include, but is not limited to: an electrical connection with one or more wires, a portable computer disk, a hard disk, a random access memory (RAM), a read only memory (ROM), an erasable programmable read only memory (Erasable Programmable Read Only Memory, EPROM or a flash), an optical fiber, a portable compact disc read only memory (Compact Disc-ROM, CD-ROM), an optical storage device, a magnetic storage device, or any suitable combination of the above. In the present disclosure, the computer readable storage medium may be a tangible medium that contains or stores a program, and the program may be used by or in combination with an instruction execution system, apparatus, or device. In the present disclosure, a computer readable signal medium may include a data signal propagated in a baseband or propagated as a part of a carrier wave, and computer readable program code is carried therein. This propagated data signal may adopt many forms, including, but not limited to, an electromagnetic signal, an optical signal, or any suitable combination of the above. The computer readable signal medium may also be any computer readable medium other than the computer readable storage medium, and the computer readable signal medium may send, propagate, or transmit the program used by or in combination with the instruction execution system, apparatus, or device. The program code contained on the computer readable medium may be transmitted by any suitable medium, including but not limited to: a wire, an optical cable, radio frequency (Radio Frequency, RF), etc., or any suitable combination of the above.

The above-mentioned computer readable medium may be included in the above-mentioned first terminal, or may exist alone without being assembled into the first terminal.

The above-mentioned computer readable medium carries thereon one or more programs which, when executed by the first terminal, cause the first terminal to perform the method illustrated according to the above-mentioned embodiment.

Computer program code used to perform operations of the present disclosure may be written in one or more programming languages or a combination thereof. The above-mentioned programming languages include an object-oriented programming language, such as Java, Smalltalk, C++, and also include a conventional procedural programming language, such as "C" language or similar programming language. Program code may be executed entirely on a computer of a user, partly on a computer of a user, executed as an independent software package, partly executed on a computer of a user and partly executed on a remote computer, or entirely executed on a remote computer or a server. In a case where a remote computer is involved, the remote computer may be connected to the computer of the user through any kind of network including a local area network (Local Area Network, LAN for short) or a wide area network (Wide Area Network, WAN for short), or, may be connected to an external computer (for example, connected via the Internet utilizing an Internet service provider).

The flowcharts and block diagrams in the accompanying drawings illustrate system architectures, functions, and operations of possible implementations of the system, method, and computer program product in accordance with various embodiments of the present disclosure. In this point, each block in the flowcharts or block diagrams may represent a module, a program segment, or a part of code, and the module, the program segment, or the part of code contains one or more executable instructions for implementing a designated logical function. It should also be noted that, in some alternative implementations, the functions marked in the blocks may also occur in a different order from the order marked in the drawings. For example, two blocks shown one after another may actually be executed substantially in parallel, or sometimes may be executed in a reverse order, which depends on the functions involved. It should also be noted that, each block in the block diagrams and/or flowcharts, and a combination of blocks in the block diagrams and/or flowcharts, may be implemented by a dedicated hardware-based system that performs designated functions or operations, or may be implemented by a combination of dedicated hardware and computer instructions.

The units involved in the description of the embodiments of the present disclosure may be implemented in software or hardware, where a name of a unit does not constitute a limitation on the unit itself in a certain case, for example, the first obtaining unit may also be described as "a unit for obtaining at least two Internet Protocol addresses".

The functions described above herein may be performed at least in part by one or more hardware logic components. For example, non-restrictively, exemplary types of hardware logic components that may be used include: a field programmable gate array (Field Programmable Gate Array, FPGA), an application specific integrated circuit (Application Specific Integrated Circuit, ASIC), an application specific standard product (Application Specific Standard Product, ASSP), a system on chip (System on Chip, SOC), a complex programmable logic device (Complex Programmable Logic Device, CPLD), and the like.

In the context of the present disclosure, a machine-readable medium may be a tangible medium that can contain or store a program for use by or in combination with an instruction execution system, apparatus or device. The machine-readable medium may be a machine-readable signal medium or a machine-readable storage medium. The machine-readable medium can include, but is not limited to, an electronic, magnetic, optical, electromagnetic, infrared, or semiconductor system, apparatus or device, or any suitable combination thereof. A more specific example of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof.

An embodiment of the present disclosure further provides a computer program that, when executed by a processor, executes the method provided by any one of the embodiments mentioned above.

In a first aspect, according to a first example of one or more embodiments of the present disclosure, a livestreaming audio processing method is provided, which is applied to a first terminal, and the method includes:

receiving, by a processor of the first terminal, second audio data sent by a second terminal;

receiving, by an audio processing apparatus of the first terminal, the second audio data and third audio data sent by the processor through different channels, where the third audio data is audio data in the first terminal;

playing, by the audio processing apparatus, the second audio data;

sending, by the audio processing apparatus, first audio data recorded by the audio processing apparatus and the third audio data to the processor; and sending, by the processor, the first audio data and the third audio data to the second terminal.

Based on the first example of the first aspect mentioned above, in a second example of the first aspect, the playing, by the audio processing apparatus, the second audio data includes: playing, by the audio processing apparatus, first mixing data obtained by mixing the second audio data and at least one of the following: the first audio data recorded by the audio processing apparatus or the third audio data.

Based on the first example of the first aspect mentioned above, in a third example of the first aspect, there are at least two pieces of the second audio data, and there are at least two pieces of the third audio data; and the receiving, by the audio processing apparatus of the first terminal, the second audio data and the third audio data sent by the processor through the different channels includes:

receiving, by the audio processing apparatus of the first terminal, the at least two pieces of the second audio data sent by the processor through at least two channels respectively, and the at least two pieces of the third audio data sent by the processor through at least two channels respectively, where each of the channels is used to send one piece of the second audio data or one piece of the third audio data.

Based on the first example of the first aspect mentioned above, in a fourth example of the first aspect, there are at least two pieces of the second audio data, and there are at least two pieces of the third audio data, and the method further includes:

mixing, by the processor, the at least two pieces of the second audio data into second mixing data, and mixing the at least two pieces of the third audio data into third mixing data; and the receiving, by the audio processing apparatus of the first terminal, the second audio data and the third audio data sent by the processor through the different channels includes:

receiving, by the audio processing apparatus of the first terminal, the second mixing data sent by the processor through one channel, and the third mixing data sent by the processor through another channel.

Based on any one of the first example to the fourth example of the first aspect mentioned above, in a fifth example of the first aspect, the sending, by the audio processing apparatus, the first audio data recorded by the audio processing apparatus and the third audio data to the processor includes:

mixing, by the audio processing apparatus, the first audio data recorded by the audio processing apparatus and the third audio data to obtain fourth mixing data; and sending, by the audio processing apparatus, the fourth mixing data to the processor through one channel; and the sending, by the processor, the first audio data and the third audio data to the second terminal includes:

sending, by the processor, the fourth mixing data to the second terminal.

Based on the third example of the first aspect mentioned above, in a sixth example of the first aspect, there are at least two pieces of the first audio data, and the sending, by the audio processing apparatus, the first audio data recorded by the audio processing apparatus and the third audio data to the processor includes:

mixing, by the audio processing apparatus, the at least two pieces of the first audio data recorded by the audio processing apparatus into fifth mixing data, and mixing the at least two pieces of the third audio data into third mixing data; and sending, by the audio processing apparatus, the fifth mixing data and the third mixing data to the processor through two channels respectively; and the sending, by the processor, the first audio data and the third audio data to the second terminal includes:

sending, by the processor, the fifth mixing data and the third mixing data to the second terminal.

Based on the third example of the first aspect mentioned above, in a seventh example of the first aspect, there are at least two pieces of the first audio data, and the sending, by the audio processing apparatus, the first audio data recorded by the audio processing apparatus and the third audio data to the processor includes:

sending, by the audio processing apparatus, the at least two pieces of the first audio data recorded by the audio processing apparatus to the processor through at least two channels respectively, and sending the at least two pieces of the third audio data to the processor through at least two channels, where each of the channels is used to send one piece of the first audio data or one piece of the third audio data.

Based on the fourth example of the first aspect mentioned above, in an eighth example of the first aspect, there are at least two pieces of the first audio data, and the sending, by the audio processing apparatus, the first audio data recorded by the audio processing apparatus and the third audio data to the processor includes:

mixing, by the audio processing apparatus, the at least two pieces of the first audio data recorded by the audio processing apparatus into fifth mixing data; and sending, by the audio processing apparatus, the fifth mixing data to the processor through the one channel, and sending the third mixing data to the processor through the another channel; and the sending, by the processor, the first audio data and the third audio data to the second terminal includes:

sending, by the processor, the fifth mixing data and the third mixing data to the second terminal.

Based on the fourth example of the first aspect mentioned above, in a ninth example of the first aspect, there are at least two pieces of the first audio data, and the sending, by the audio processing apparatus, the first audio data recorded by the audio processing apparatus and the third audio data to the processor includes:

sending, by the audio processing apparatus, the at least two pieces of the first audio data recorded by the audio processing apparatus to the processor through at least two channels respectively, and sending the third mixing data to the processor through one channel, where each of the channels is used to send one piece of the first audio data or one piece of the third mixing data; and the sending, by the processor, the first audio data and the third audio data to the second terminal includes:

sending, by the processor, the at least two pieces of the first audio data and the third mixing data to the second terminal.

Based on the first example of the first aspect mentioned above, in a tenth example of the first aspect, the first terminal is a terminal device used by a streamer during live streaming, and the second terminal is a terminal device used by another streamer or a viewer during live streaming.

In a second aspect, according to a first example of one or more embodiments of the present disclosure, a first terminal is provided, which includes: a processor and an audio processing apparatus;

where the processor is configured to receive second audio data sent by a second terminal;

the audio processing apparatus is configured to receive the second audio data and third audio data sent by the processor through different channels, where the third audio data is audio data in the first terminal;

the audio processing apparatus is configured to play the second audio data;

the audio processing apparatus is configured to send first audio data recorded by the audio processing apparatus and the third audio data to the processor; and the processor is configured to send the first audio data and the third audio data to the second terminal.

Based on the first example of the second aspect mentioned above, in a second example of the second aspect, the audio processing apparatus is further configured to play first mixing data obtained by mixing the second audio data and at least one of the following: the first audio data recorded by the audio processing apparatus or the third audio data.

Based on the first example of the second aspect mentioned above, in a third example of the second aspect, there are at least two pieces of the second audio data, and there are at least two pieces of the third audio data; and the audio processing apparatus is further configured to receive the at least two pieces of the second audio data sent by the processor through at least two channels respectively, and the at least two pieces of the third audio data sent by the processor through at least two channels respectively, where each of the channels is used to send one piece of the second audio data or one piece of the third audio data.

Based on the first example of the second aspect mentioned above, in a fourth example of the second aspect, there are at least two pieces of the second audio data, and there are at least two pieces of the third audio data; and the processor is further configured to:

mix the at least two pieces of the second audio data into second mixing data, and mix the at least two pieces of the third audio data into third mixing data; and the audio processing apparatus is further configured to:

receive the second mixing data sent by the processor through one channel, and the third mixing data sent by the processor through another channel.

Based on any one of the first example to the fourth example of the second aspect mentioned above, in a fifth example of the second aspect, the audio processing apparatus is further configured to:

mix the first audio data recorded by the audio processing apparatus and the third audio data to obtain fourth mixing data; and send the fourth mixing data to the processor through one channel; and the processor is further configured to: send the fourth mixing data to the second terminal.

Based on the third example of the second aspect mentioned above, in a sixth example of the second aspect, there are at least two pieces of the first audio data, and the audio processing apparatus is further configured to:

mix the at least two pieces of the first audio data into fifth mixing data, and mix the at least two pieces of the third audio data into third mixing data; and send the fifth mixing data and the third mixing data to the processor through two channels respectively; and the processor is further configured to: send the fifth mixing data and the third mixing data to the second terminal.

Based on the third example of the second aspect mentioned above, in a seventh example of the second aspect, there are at least two pieces of the first audio data recorded by the audio processing apparatus, and the audio processing apparatus is further configured to send the at least two pieces of the first audio data recorded by the audio processing apparatus to the processor through at least two channels respectively, and send the at least two pieces of the third audio data to the processor through at least two channels, where each of the channels is used to send one piece of the first audio data or one piece of the third audio data.

Based on the fourth example of the second aspect mentioned above, in an eighth example of the second aspect, there are at least two pieces of the first audio data recorded by the audio processing apparatus, and the audio processing apparatus is further configured to:

mix the at least two pieces of the first audio data recorded by the audio processing apparatus into fifth mixing data; and send the fifth mixing data to the processor through one channel, and send the third mixing data to the processor through another channel; and the processor is further configured to send the fifth mixing data and the third mixing data to the second terminal.

Based on the fourth example of the second aspect mentioned above, in a ninth example of the second aspect, there are at least two pieces of the first audio data, and the audio processing apparatus is further configured to send the at least two pieces of the first audio data recorded by the audio processing apparatus to the processor through at least two channels respectively, and send the third mixing data to the processor through one channel, where each of the channels is used to send one piece of the first audio data or one piece of the third mixing data; and the processor is further configured to send the at least two pieces of the first audio data and the third mixing data to the second terminal.

Based on the first example of the second aspect mentioned above, in a tenth example of the second aspect, the first terminal is a terminal device used by a streamer during livestreaming, and the second terminal is a terminal device used by another streamer or a viewer during livestreaming.

In a third aspect, according to one or more embodiments of the present disclosure, a computer-readable storage medium is provided, the computer-readable storage medium stores thereon computer-executable instructions, and when a processor and an audio processing apparatus execute the computer-executable instructions, the method according to the first aspect and various possible designs thereof mentioned above is implemented.

In a fourth aspect, according to one or more embodiments of the present disclosure, a computer program is provided, the computer program is used to implement the method according to the first aspect and various possible designs thereof mentioned above.

The above description is merely preferred embodiments of the present disclosure and an illustration of the applied technical principles. Those skilled in the art should understand that, the disclosure scope involved in the present disclosure is not limited to the technical solutions formed by a specific combination of the above technical features, but also should cover other technical solutions formed by an arbitrary combination of the above technical features or their equivalent features without departing from the above disclosure concept, for example, a technical solution formed by replacing the above features with technical features with similar functions disclosed (but not limited to) in the present disclosure.

In addition, although respective operations are described in a specific order, this should not be interpreted as requiring these operations to be performed in the specific order shown or in a sequential order. Under certain circumstances, multitasking and parallel processing may be advantageous. Similarly, although several specific implementation details are included in the above discussion, these should not be interpreted as limiting the scope of the present disclosure. Certain features described in the context of individual embodiments may also be implemented in combination in a single embodiment. Conversely, various features described in the context of a single embodiment may also be implemented in multiple embodiments individually or in any suitable sub-combination.

Although the subject matter has been described in language specific to structural features and/or method logical actions, it should be understood that the subject matter defined in the appended claims is not limited to the specific features or actions described above. On the contrary, the specific features and actions described above are only example forms for implementing the claims.

What is claimed is:

1. A livestreaming audio processing method, applied to a first terminal, wherein the method comprises:

receiving, by a processor of the first terminal, second audio data sent by a second terminal;

receiving, by an audio processing apparatus of the first terminal, the second audio data and third audio data sent by the processor through different channels, wherein the third audio data is audio data in the first terminal;

playing, by the audio processing apparatus, the second audio data;

sending, by the audio processing apparatus, first audio data recorded by the audio processing apparatus and the third audio data to the processor; and sending, by the processor, the first audio data and the third audio data to the second terminal;

wherein there are at least two pieces of the second audio data, and there are at least two pieces of the third audio data; and the receiving, by the audio processing apparatus of the first terminal, the second audio data and the third audio data sent by the processor through the different channels comprises:

receiving, by the audio processing apparatus of the first terminal, the at least two pieces of the second audio data sent by the processor through at least two channels respectively, and the at least two pieces of the third audio data sent by the processor through at least two channels respectively, wherein each of the channels is used to send one piece of the second audio data or one piece of the third audio data.

2. The method according to claim 1, wherein the playing, by the audio processing apparatus, the second audio data comprises:

playing, by the audio processing apparatus, first mixing data obtained by mixing the second audio data and at least one of the following: the first audio data recorded by the audio processing apparatus or the third audio data.

3. The method according to claim 1, further comprising:

mixing, by the processor, the at least two pieces of the second audio data into second mixing data, and mixing the at least two pieces of the third audio data into third mixing data;

wherein the receiving, by the audio processing apparatus of the first terminal, the second audio data and the third audio data sent by the processor through the different channels comprises:

receiving, by the audio processing apparatus of the first terminal, the second mixing data sent by the processor through one channel, and the third mixing data sent by the processor through another channel.

4. The method according to claim 3, wherein there are at least two pieces of the first audio data, and the sending, by the audio processing apparatus, the first audio data recorded by the audio processing apparatus and the third audio data to the processor comprises:

mixing, by the audio processing apparatus, the at least two pieces of the first audio data recorded by the audio processing apparatus into fifth mixing data;

sending, by the audio processing apparatus, the fifth mixing data to the processor through the one channel, and sending the third mixing data to the processor through the another channel; and wherein the sending, by the processor, the first audio data and the third audio data to the second terminal comprises:

sending, by the processor, the fifth mixing data and the third mixing data to the second terminal.

5. The method according to claim 3, wherein there are at least two pieces of the first audio data, and the sending, by the audio processing apparatus, the first audio data recorded by the audio processing apparatus and the third audio data to the processor comprises:

sending, by the audio processing apparatus, the at least two pieces of the first audio data recorded by the audio processing apparatus to the processor through at least two channels respectively, and sending the third mixing data to the processor through one channel, wherein each of the channels is used to send one piece of the first audio data or one piece of the third mixing data; and wherein the sending, by the processor, the first audio data and the third audio data to the second terminal comprises:

sending, by the processor, the at least two pieces of the first audio data and the third mixing data to the second terminal.

6. The method according to claim 1, wherein the sending, by the audio processing apparatus, the first audio data recorded by the audio processing apparatus and the third audio data to the processor comprises:

mixing, by the audio processing apparatus, the first audio data recorded by the audio processing apparatus and the third audio data to obtain fourth mixing data; and sending, by the audio processing apparatus, the fourth mixing data to the processor through one channel; and wherein the sending, by the processor, the first audio data and the third audio data to the second terminal comprises:

sending, by the processor, the fourth mixing data to the second terminal.

7. The method according to claim 1, wherein there are at least two pieces of the first audio data, and the sending, by the audio processing apparatus, the first audio data recorded by the audio processing apparatus and the third audio data to the processor comprises:

mixing, by the audio processing apparatus, the at least two pieces of the first audio data recorded by the audio processing apparatus into fifth mixing data, and mixing the at least two pieces of the third audio data into third mixing data; and sending, by the audio processing apparatus, the fifth mixing data and the third mixing data to the processor through two channels respectively;

wherein the sending, by the processor, the first audio data and the third audio data to the second terminal comprises:

sending, by the processor, the fifth mixing data and the third mixing data to the second terminal.

8. The method according to claim 1, wherein there are at least two pieces of the first audio data, and the sending, by the audio processing apparatus, the first audio data recorded by the audio processing apparatus and the third audio data to the processor comprises:

sending, by the audio processing apparatus, the at least two pieces of the first audio data recorded by the audio processing apparatus to the processor through at least two channels respectively, and sending the at least two pieces of the third audio data to the processor through at least two channels, wherein each of the channels is used to send one piece of the first audio data or one piece of the third audio data.

9. The method according to claim 1, wherein the first terminal is a terminal device used by a streamer during livestreaming, and the second terminal is a terminal device used by another streamer or a viewer during livestreaming.

10. A first terminal, comprising: a processor and an audio processing apparatus;

wherein the processor is configured to receive second audio data sent by a second terminal;

the audio processing apparatus is configured to receive the second audio data and third audio data sent by the processor through different channels, wherein the third audio data is audio data in the first terminal;

the audio processing apparatus is configured to play the second audio data;

the audio processing apparatus is configured to send first audio data recorded by the audio processing apparatus and the third audio data to the processor; and the processor is configured to send the first audio data and the third audio data to the second terminal;

wherein there are at least two pieces of the second audio data, and there are at least two pieces of the third audio data; and the audio processing apparatus is further configured to receive the at least two pieces of the second audio data sent by the processor through at least two channels respectively, and the at least two pieces of the third audio data sent by the processor through at least two channels respectively, wherein each of the channels is used to send one piece of the second audio data or one piece of the third audio data.

11. The first terminal according to claim 10, wherein the audio processing apparatus is further configured to play first mixing data obtained by mixing the second audio data and at least one of the following: the first audio data recorded by the audio processing apparatus or the third audio data.

12. The first terminal according to claim 10, wherein the processor is further configured to:

mix the at least two pieces of the second audio data into second mixing data, and mix the at least two pieces of the third audio data into third mixing data; and the audio processing apparatus is further configured to:

receive the second mixing data sent by the processor through one channel, and the third mixing data sent by the processor through another channel.

13. The first terminal according to claim 12, where there are at least two pieces of the first audio data, and the audio processing apparatus is further configured to:

mix the at least two pieces of the first audio data recorded by the audio processing apparatus into fifth mixing data; and send the fifth mixing data to the processor through the one channel, and send the third mixing data to the processor through the another channel; and the processor is further configured to send the fifth mixing data and the third mixing data to the second terminal.

14. The first terminal according to claim 12, wherein there are at least two pieces of the first audio data, and the audio processing apparatus is further configured to:

send the at least two pieces of the first audio data recorded by the audio processing apparatus to the processor through at least two channels respectively, and send the third mixing data to the processor through one channel, wherein each of the channels is used to send one piece of the first audio data or one piece of the third mixing data; and the processor is further configured to send the at least two pieces of the first audio data and the third mixing data to the second terminal.

15. The first terminal according to claim 10, wherein the audio processing apparatus is further configured to:

mix the first audio data recorded by the audio processing apparatus and the third audio data to obtain fourth mixing data; and send the fourth mixing data to the processor through one channel; and the processor is further configured to send the fourth mixing data to the second terminal.

16. The first terminal according to claim 10, wherein there are at least two pieces of the first audio data, and the audio processing apparatus is further configured to:

mix the at least two pieces of the first audio data recorded by the audio processing apparatus into fifth mixing data, and mix the at least two pieces of the third audio data into third mixing data; and send the fifth mixing data and the third mixing data to the processor through two channels respectively; and the processor is further configured to send the fifth mixing data and the third mixing data to the second terminal.

17. The first terminal according to claim 10, wherein there are at least two pieces of the first audio data, and the audio processing apparatus is further configured to send the at least two pieces of the first audio data recorded by the audio processing apparatus to the processor through at least two channels respectively, and send the at least two pieces of the third audio data to the processor through at least two channels, wherein each of the channels is used to send one piece of the first audio data or one piece of the third audio data.

18. A non-transitory computer-readable storage medium, wherein the non-transitory computer-readable storage medium stores computer-executable instructions therein, and when a first terminal comprising a processor and an audio processing apparatus executes the computer-executable instructions, the first terminal is caused to:

control the processor of the first terminal to receive second audio data sent by a second terminal;

control the audio processing apparatus of the first terminal to receive the second audio data and third audio data sent by the processor through different channels, wherein the third audio data is audio data in the first terminal;

control the audio processing apparatus to play the second audio data;

control the audio processing apparatus to send first audio data recorded by the audio processing apparatus and the third audio data to the processor; and control the processor to send the first audio data and the third audio data to the second terminal;

wherein there are at least two pieces of the second audio data, and there are at least two pieces of the third audio data; and the first terminal being caused to control the audio processing apparatus of the first terminal to receive the second audio data and the third audio data sent by the processor through the different channels comprises the first terminal being caused to:

control the audio processing apparatus of the first terminal to receive the at least two pieces of the second audio data sent by the processor through at least two channels respectively, and the at least two pieces of the third audio data sent by the processor through at least two channels respectively, wherein each of the channels is used to send one piece of the second audio data or one piece of the third audio data.

* * * * *